Nov. 7, 1944. H. SWANSON 2,362,176
FLASHLIGHT FULL-BEAM ELECTRIC LAMP
Filed March 25, 1943 10 Sheets-Sheet 1

Witnesses:
Florence Hilston
Gustave W. Hilston

Inventor
Harold Swanson

Nov. 7, 1944. H. SWANSON 2,362,176
FLASHLIGHT FULL-BEAM ELECTRIC LAMP
Filed March 25, 1943 10 Sheets-Sheet 2
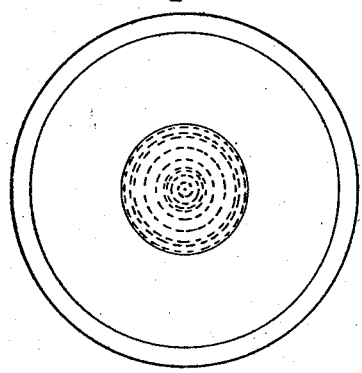
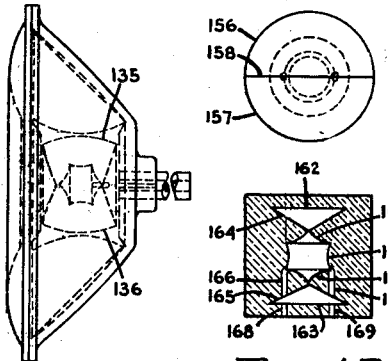
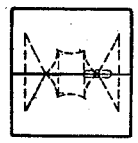
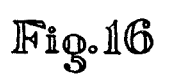
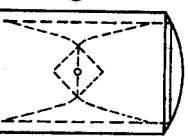
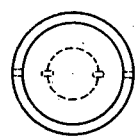
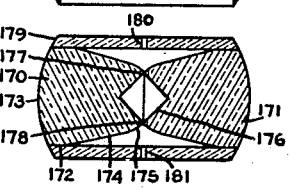
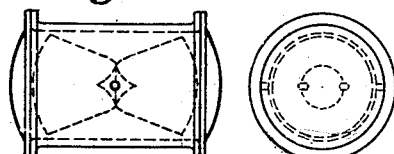
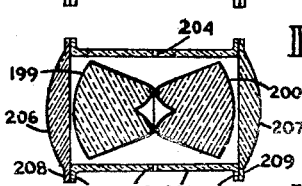

Nov. 7, 1944.  H. SWANSON  2,362,176
FLASHLIGHT FULL-BEAM ELECTRIC LAMP
Filed March 25, 1943   10 Sheets-Sheet 3
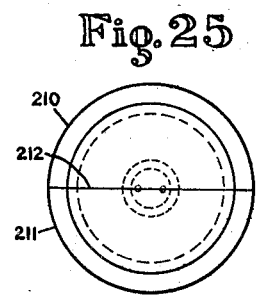
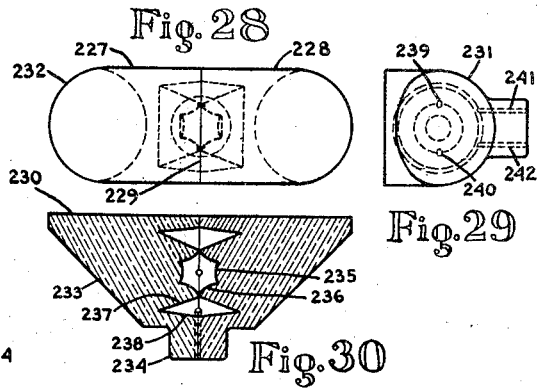
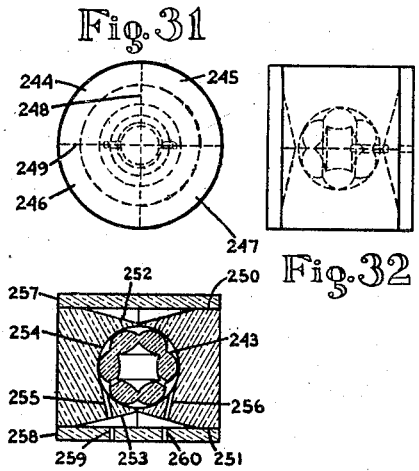
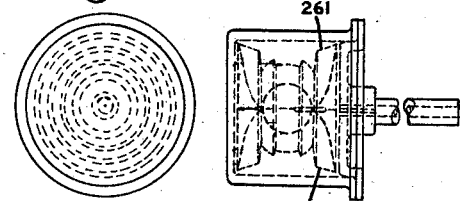
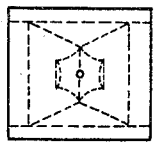
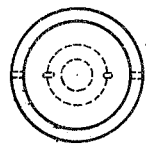
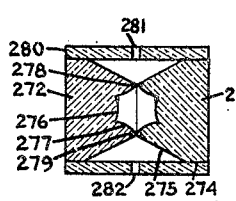
Witnesses:
Florence Hilston
Gustave W. Hilston
Inventor
Harold Swanson Nov. 7, 1944.  H. SWANSON  2,362,176
FLASHLIGHT FULL-BEAM ELECTRIC LAMP
Filed March 25, 1943    10 Sheets-Sheet 4
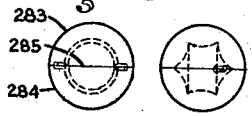

Nov. 7, 1944. H. SWANSON 2,362,176
FLASHLIGHT FULL-BEAM ELECTRIC LAMP
Filed March 25, 1943 10 Sheets-Sheet 5
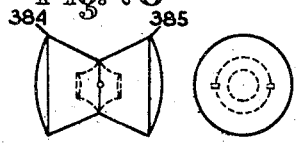
Fig.76
Fig.77
Fig.78
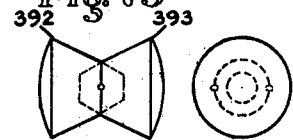
Fig.79
Fig.80
Fig.81
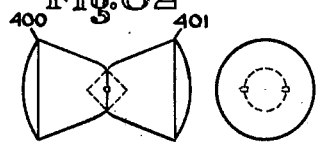
Fig.82
Fig.83
Fig.84
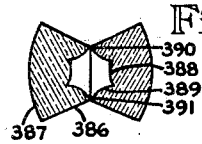
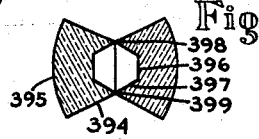
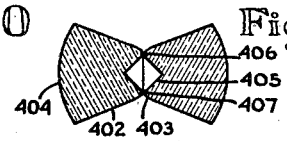
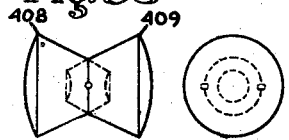
Fig.85
Fig.86
Fig.87
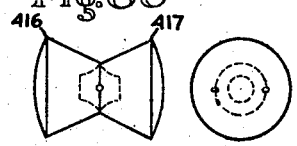
Fig.88
Fig.89
Fig.90
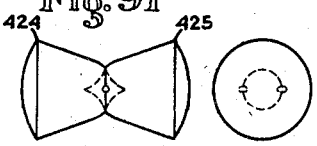
Fig.91
Fig.92
Fig.93
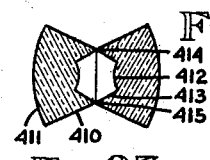
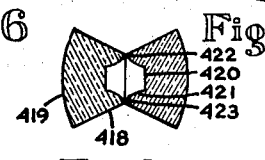
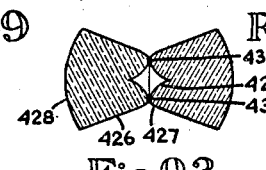
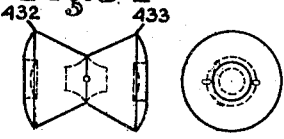
Fig.94
Fig.95
Fig.96
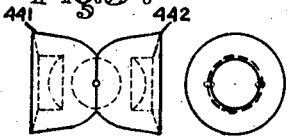
Fig.97
Fig.98
Fig.99
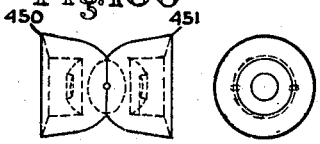
Fig.100
Fig.101
Fig.102
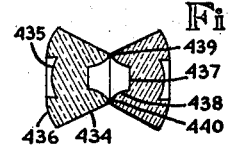
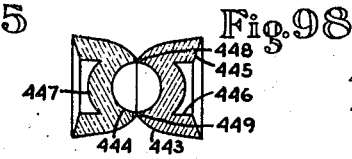
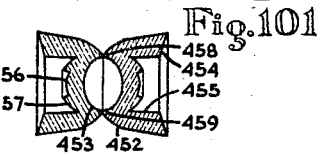
Witnesses:
Florence Hilston
Gustave W. Hilston
Inventor
Harold Swanson Nov. 7, 1944. H. SWANSON 2,362,176
FLASHLIGHT FULL-BEAM ELECTRIC LAMP
Filed March 25, 1943 10 Sheets-Sheet 6
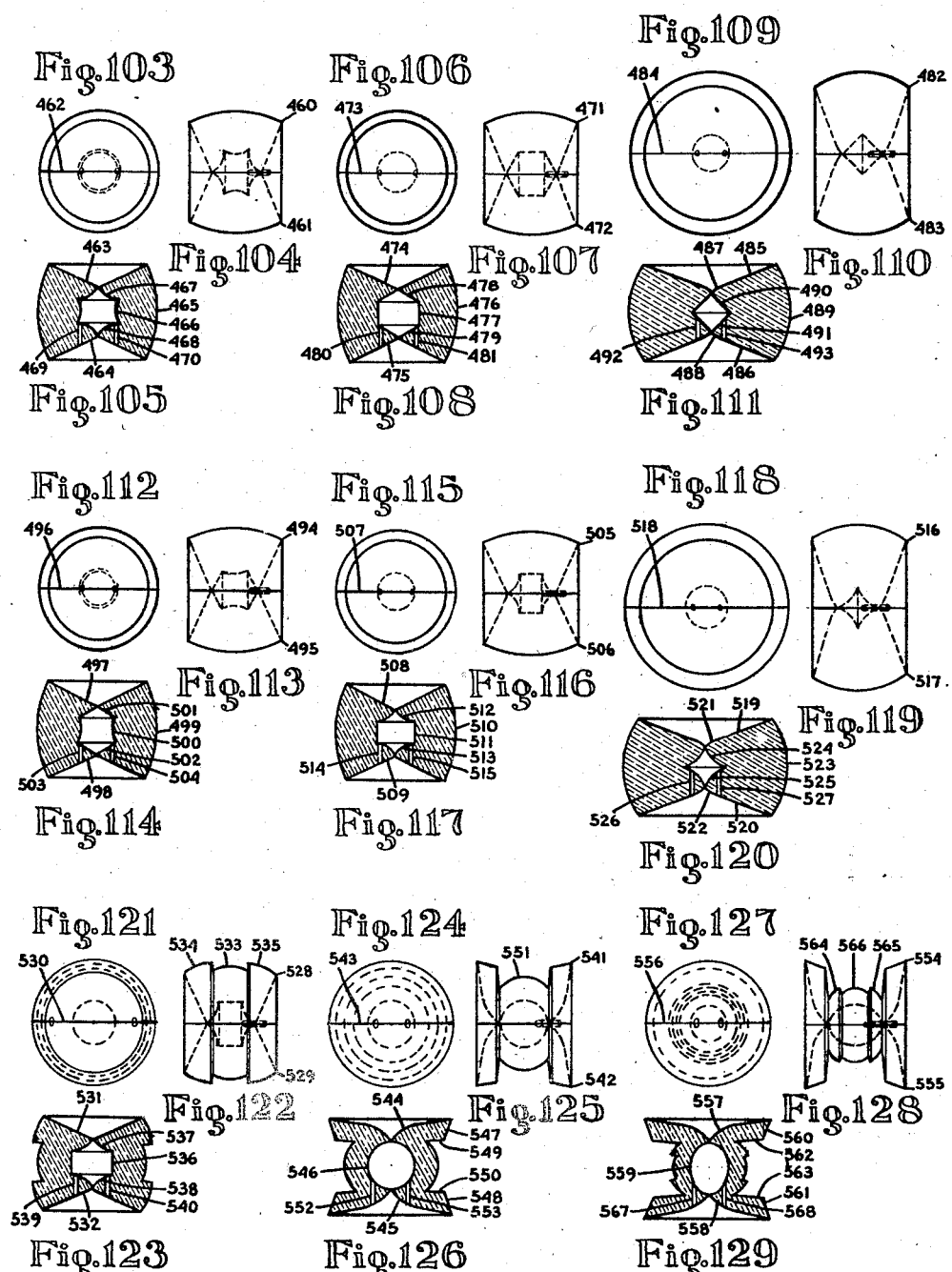

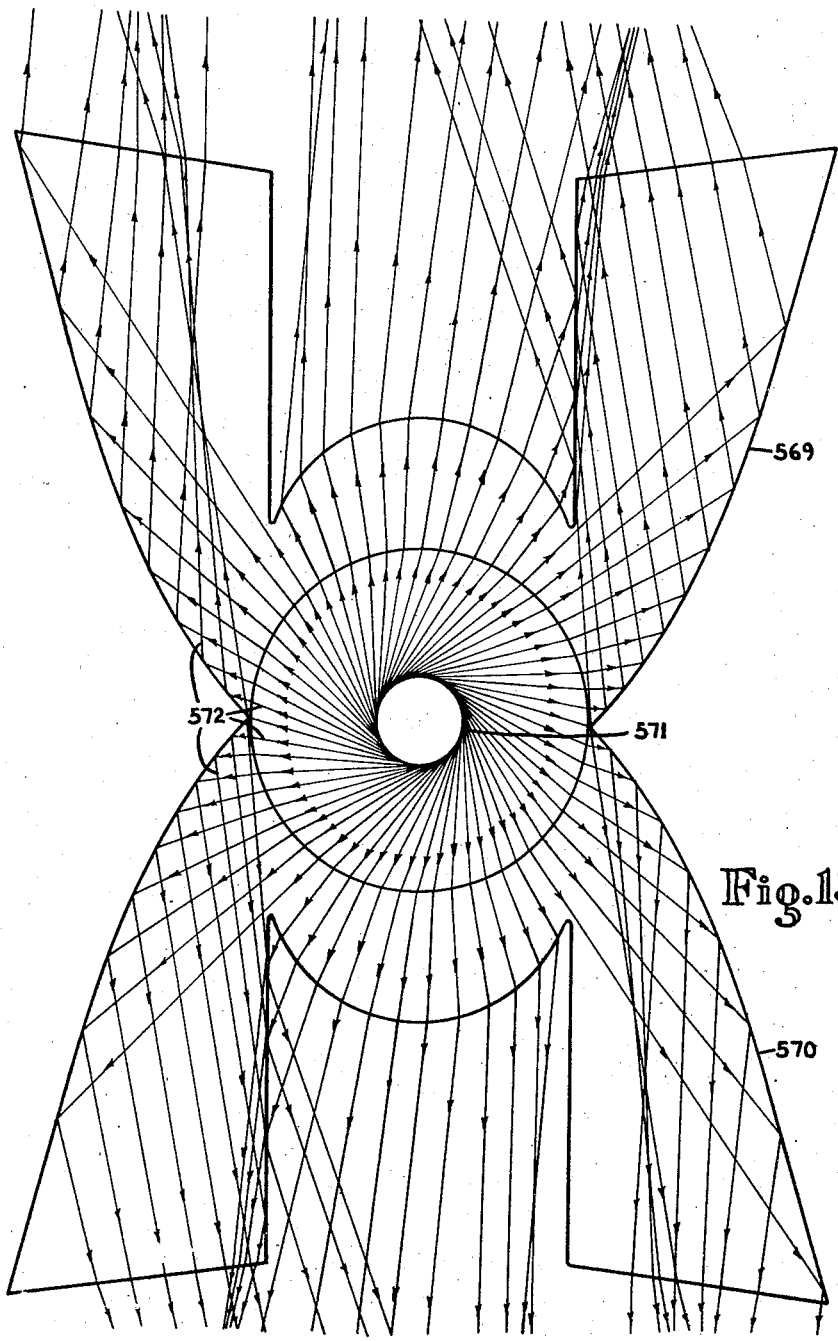

Nov. 7, 1944.   H. SWANSON   2,362,176
FLASHLIGHT FULL-BEAM ELECTRIC LAMP
Filed March 25, 1943   10 Sheets-Sheet 8

Nov. 7, 1944. H. SWANSON 2,362,176
FLASHLIGHT FULL-BEAM ELECTRIC LAMP
Filed March 25, 1943 10 Sheets-Sheet 9

Patented Nov. 7, 1944

2,362,176

UNITED STATES PATENT OFFICE 2,362,176

FLASHLIGHT FULL-BEAM ELECTRIC LAMP

Harold Swanson, Brownhelm Township, Lorain County, Ohio

Application March 25, 1943, Serial No. 480,425

8 Claims. (Cl. 176—34)

This invention relates to improvements to increase the effective illumination produced by the focusing type of electric lamps and similar articles, but more particularly those electric lamps which are commonly known as flashlight lamps, mostly used in hand lights with electric dry-cell batteries.

One object of this invention is to show a practical means of constructing a flashlight electric lamp with optical elements that completely surround the lamp's light source and gather the light produced into a concentrated beam. These optical elements are described herein as full-beam refracting elements, and it is through them that the flashlight full-beam electric lamps were invented.

A further object is that this application, together with my copending applications Serial Numbers 480,420; 480,421; 480,422; 480,423 and 480,424, filed March 25, 1943, is in part a continuation of my full-beam electric lamp application Serial Number 402,778, filed July 17, 1941, in which nearly an exact duplicated description of these inventions were originally presented. The feature which is generic to all these inventions is the full-beam refracting element and its adaptation in construction, and operation to gather the light in nearly all directions from a light source into a concentrated beam, as applied to electric lamps; however on account of the present Patent Office regulations restricting the limitations presented in a single application, it was necessary to segregate these applications.

A further object is to show that certain improvements set forth in my original application Serial Number 744,598, filed Sept. 18, 1934, and subsequently continued through the following; Patent Number 2,097,679, patented Nov. 2, 1937, Patent Number 2,137,732, patented Nov. 22, 1938, Patent Number 2,154,542, patented April 18, 1939, Patent Number 2,222,093, patented Nov. 19, 1940, are adaptable to make flashlight full-beam electric lamps and similar articles.

A further object is that this invention shall be a continuation of my earlier inventions mentioned in the preceding paragraph, in respect to where any improvements or subject matter of my earlier inventions can be used to advantage with the improvements of this invention, particularly the use of hollow metal wires and their many features which are described in the previous applications or patents and in this application.

A further object is that many features or improvements used in connection with my copending applications, previously referred to, can be used to advantage with this application, particularly the full-beam refracting elements and the many cross combinations possible by their substitution herein.

Other objects of this invention will appear more fully described and illustrated hereinafter.

While it is practical to adapt the improvements of this invention to a large variety of electric lamps, the present Patent Office regulations restrict the claims that are allowed in a single patent which illustrates more than three types. In the accompanying drawings I have illustrated several types of lamps to show that I have not overlooked the possibilities of many variations to apply these improvements. The one feature which is common or generic to all types shown, is the full-beam refracting elements adapted to flashlight electric lamps, around which this invention becomes apparent by the following in which:

Fig. 10 to Fig. 39 are enlarged elevational and sectional views of the assembled full-beam refracting elements for flashlight full-beam electric lamps. In some views their glass connecting parts are also shown.

Fig. 40 to Fig. 129 are enlarged elevational and sectional views of inner full-beam refracting elements for flashlight full-beam electric lamps.

Fig. 130 to Fig. 133 are enlarged light propagation diagrammatic views of the full-beam refracting elements for flashlight full-beam electric lamps.

Figure 1:
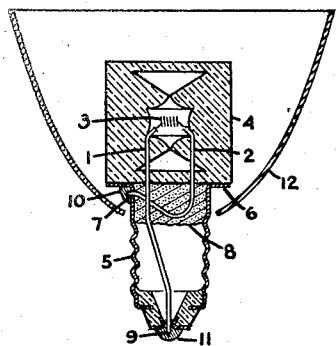
Fig. 1 to Fig. 9 are enlarged sectional views of individual flashlight full-beam electric lamps.

Referring to Fig. 1 which is an enlarged sectional view of a flashlight full-beam electric lamp; having two hollow metal wires 1 and 2 being the lead-in wires with notched openings cut through the walls near the inner ends for exhausting or gas filling operations; the ends of a coiled electric lamp filament 3 being inserted into the ends of the hollow metal wires 1 and 2 and clamped or spot-welded together, forming the filament mount; two halves of a full-beam refracting element 4 (see Fig. 13 to Fig. 15 for details), being made from heat resisting glass (only the rear half of element 4 is shown here), are coated on their junction surfaces with a thin film of suitable glass fusing material, and after positioning the filament mount in place, the halves are hermetically sealed together by glass fusion; a standard electric lamp miniature screw base 5 having a flanged end at 6, with a lead-in wire hole or notched groove 7, is coated on the inside with a suitable basing cement 8 and cemented to element 4 as shown, with the hollow metal wires 1 and 2 threaded through the base 5 at 7 and 9; then the lamp is exhausted to a vacuum, or exhausted and filled with an inert gas, at either low or high pressures, up to a safe working pressure, through the hollow metal wires 1 and 2 which are swaged or flattened and cut off to form the preliminary seals and later the final seals at 10 and 11 are made by soldering the ends air tight as they are soldered to the lamp base 5. The parabolic metal reflector 12 shows the relative position of this type of flashlight full-beam electric lamp when used within a hand flashlight case.

Figure 2:
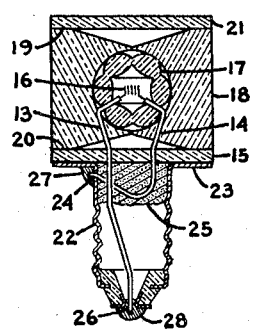

Referring to Fig. 2 which is an enlarged sectional view of a flashlight full-beam electric lamp; having two hollow metal wires 13 and 14 being the lead-in wires with notched openings cut through the walls near the inner ends for exhausting or gas filling operations; the ends of a coiled electric lamp filament 16 being inserted into the ends of the hollow metal wires 13 and 14 and clamped or spot-welded together, forming the filament mount; two halves of an inner full-beam refracting element 17 (see Fig. 43 to Fig. 45 for details) being made from heat resisting glass (only the rear half of element 17 is shown here), are coated on their junction surfaces with a film of suitable glass fusing material, into which the filament mount is positioned, enclosed, and hermetically sealed by glass fusion to form the inner full-beam refracting element assembly; four quarter full-beam refracting elements 18 (see Fig. 31 to Fig. 33 for details), being made from heat resisting glass (only the two rear quarters of elements 18 are shown here) are coated on their junction surfaces with a thin film of suitable glass fusing material, and after positioning the inner full-beam refracting element assembly in place the quarters are hermetically sealed together by glass fusion; a glass circular connecting plate 15 with lead-in wire holes for hollow metal wires 13 and 14, and another glass plate 21 are coated all around their edges at 19 and 20 respectively with a film of suitable glass fusing material (see Fig. 31 to Fig. 33 for details), and after positioning with elements 18 as shown, the plates 15 and 21 are hermetically sealed thereto by glass fusion; a standard electric lamp miniature screw base 22 having a flanged end at 23, with a lead-in wire hole or notched groove at 24, is coated on the inside with a suitable basing cement 25 and cemented to the plate 15 as shown, with the hollow metal wires 13 and 14 threaded through the base 22 at 24 and 26; then the lamp is exhausted to a vacuum, or exhausted and filled with an inert gas, at either low or high pressure, up to a safe working pressure, through the hollow metal wires 13 and 14 which are swaged or flattened and cut off to form the preliminary seals and later the final seals at 27 and 28 are made by soldering the ends air tight as they are soldered to the lamp base 22.

Figure 3:
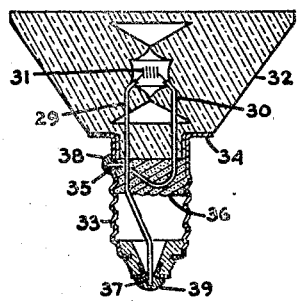

Referring to Fig. 3 which is an enlarged sectional view of a flashlight full-beam electric lamp; having two hollow metal wires 29 and 30 being the lead-in wires with notched openings cut through the walls near the inner ends for exhausting or gas filling operations, the ends of a coiled electric lamp filament 31 being inserted into the ends of the hollow metal wires 29 and 30 and clamped or spot-welded together, forming the filament mount; two halves of a full-beam refracting element 32 (see Fig. 19 to Fig. 21 for details) being made from heat resisting glass (only the rear half of element 32 is shown here), and coated on their junction surfaces with a thin film of suitable glass fusing material, and after positioning the filament mount in place, the halves are hermetically sealed together by glass fusion; a standard electric lamp miniature screw base 33 having a flanged end at 34, with a lead-in wire hole or notched groove at 35, is coated on the inside with a suitable basing cement 36 and cemented to the element 32 as shown, with the hollow metal wires 29 and 30 threaded through the base 33 at 35 and 37; then the lamp is exhausted to a vacuum, or exhausted and filled with an inert gas, at either low or high pressures, up to a safe working pressure, through the hollow metal wires 29 and 30 which are swaged or flattened and cut off to form the preliminary seals and later the final seals at 38 and 39 are made by soldering the ends air tight as they are soldered to the lamp base 33.

Figure 4:
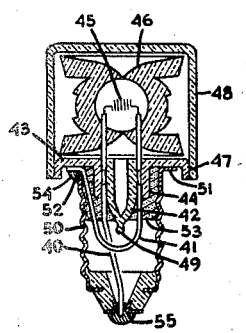

Referring to Fig. 4 which is an enlarged sectional view of a flashlight full-beam electric lamp; having two regular three-piece electric lamp lead-in wires 40 and 41, a glass exhaust tube 42, and the outer glass flange 43, all hermetically sealed together by glass fusion, with heat applied all around the flange neck 44; the ends of a coiled electric lamp filament 45 are clamped or spot-welded together with the inner ends of the lead-in wires 40 and 41 holding the filament 45 in focusing position; two halves of a full-beam refracting element 46 (see Fig. 124 to Fig. 126 for similar detail) being made from heat resisting glass (only the rear half of element 46 is shown here), enclosing the filament 45; the edge of the flange 43 is coated with a film of glass fusing material all around at 47 and (or without coating if desired) hermetically sealed by glass fusion with the outer glass cup 48 at 47 (see Fig. 34 to Fig. 36 for similar details); then the lamp is exhausted to a vacuum, or exhausted and filled with an inert gas, at low pressure, through the contracted glass exhaust tube 42 which is heated and tipped off at 49; a standard electric lamp miniature screw base 50 having a flanged end 51, with a lead-in wire hole or notched groove at 52, is coated on the inside with a suitable basing cement 53 and cemented to the neck of the flange as shown with the lead-in wires 40 and 41 soldered to the base 50 at 54 and 55.

Figure 5:
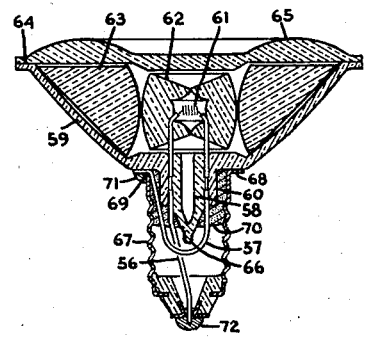

Referring to Fig. 5 which is an enlarged sectional view of a flashlight full-beam electric lamp; having two regular three-piece electric lamp lead-in wires 56 and 57, a glass exhaust tube 58, and the outer glass bowl 59 (see Fig. 10 to Fig. 12 for details) all hermetically sealed together by glass fusion, with heat applied all around the bowl neck 60; the ends of a coiled electric lamp filament 61 are clamped or spot-welded together with the inner ends of the lead-in wires 56 and 57 holding the filament 61 in focusing position; two halves of the inner full-beam refracting element 62 (see Fig. 103 to Fig. 105 for detail) being made from heat resisting glass (only the rear half of the element 62 is shown here) enclosing the filament 61; an outer full-beam refracting element 63 (see Fig. 10 to Fig. 12 for detail) being made from heat resisting glass, is set into the bowl 59 around the element 62; the upper flanged brim of the bowl 59 is coated with a film of glass fusing material all around at 64 and (or without coating if desired) hermetically sealed by glass fusion with the glass bowl cover 65 at 64; then the lamp is exhausted to a vacuum, or exhausted and filled with an inert gas, at low pressure, through the contracted glass exhausted tube 55 which is heated and tipped off at 66; a standard electric lamp miniature screw base 67 having a flanged end at 68 with a lead-in wire hole or notched groove at 69, is coated on the inside with a suitable basing cement 70 and cemented to the neck of the bowl as shown, with the lead-in wires 56 and 57 soldered to the base 67 at 71 and 72.

Figure 6:
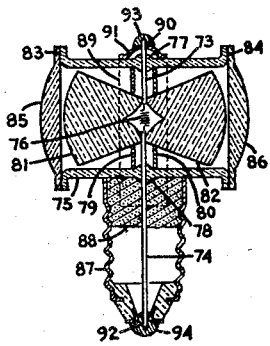

Referring to Fig. 6 which is an enlarged sectional view of a flashlight full-beam electric lamp; having two hollow metal wires 73 and 74 being the lead-in wires with notched openings cut through the walls near the inner ends for exhausting or gas filling operations are inserted through the holes in the outer glass tube 75 (see Fig. 22 to Fig. 24 for detail); the ends of a coiled electric lamp filament 76 being inserted into the ends of the hollow metal wires 73 and 74, and clamped or spot-welded together, forming the filament mount within the tube 75; the filament mount is positioned, and a mass of glass fusing material is coated around the hollow metal wires 73 and 74, both inside and outside of the tube 75, and then hermetically sealed in place by glass fusion at 77 and 78; two mica or other suitable material washers 79 and 80 are snugly fitted inside of the tube 75 to support the center of two halves of the inner full-beam refracting elements 81 and 82 (see Fig. 91 to Fig. 93 for detail) being made from heat resisting glass, enclosing the filament 76; the flanged edges of the tube 75 are coated with a film of suitable glass fusing material all around at 83 and 84 and (or without coating if desired) hermetically sealed by glass fusion with the outer glass lenses 85 and 86 all around the edges at 83 and 84; a standard electric lamp miniature screw base 87, with its open end cut horizontally cylindrical to form fit the tube 75, is coated on the inside with a suitable basing cement 88 and later heated for cementing together; a formed thin metal clasp 89, having a hole at 90, and a raised groove at 91 affording clearance for the seal at 77, is place over the hollow metal wire 73 and tightly wrapped around the tube 75 with the ends inserted into the base 87 and soldered together at the base rim junction, while the other hollow metal wire 74 is threaded through the base end eyelet at 92; then the lamp is exhausted to a vacuum, or exhausted and filled with an inert gas, at either low or high pressures, up to a safe working pressure, through the hollow metal wires 73 and 74 which are swaged or flattened and cut off to form the preliminary seals and later the final seals at 93 and 94 are made by soldering the ends air tight as they are soldered to the clasp 89 and the end of the lamp base at 92.

Figure 7:
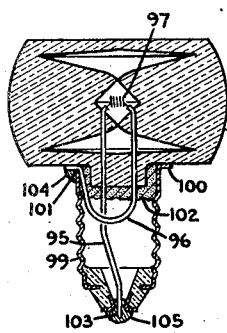

Referring to Fig. 7 which is an enlarged sectional view of a flashlight full-beam electric lamp; having two hollow metal wires 95 and 96 being the lead-in wires with notched openings cut through the walls near the inner ends for exhausting or gas filling operations; the ends of a coiled electric lamp filament 97 being inserted into the ends of the hollow metal wires 95 and 96 and clamped or spot-welded together, forming the filament mount; two halves of a full-beam refracting element 98 (see Fig. 25 to Fig. 27 for details), being made from heat resisting glass, (only the rear half of element 98 is shown here) are coated on their junction surfaces with a thin film of suitable glass fusing material, and after positioning the filament mount in place, the halves are hermetically sealed together by glass fusion; a standard electric lamp miniature screw base 99 having a flanged end at 100, with a lead-in wire hole or notched groove at 101, is coated on the inside with a suitable basing cement 102 and cemented to element 98 as shown, with the hollow metal wires 95 and 96 threaded through the base 99 at 101 and 103; then the lamp is exhausted to a vacuum, or exhausted and filled with an inert gas, at either low or high pressures, up to a safe working pressure, through the hollow metal wires 95 and 96 which are swaged or flattened and cut off to form the preliminary seals and later the final seals at 104 and 105 are made by soldering the ends air tight as they are soldered to the lamp base 99.

Figure 8:
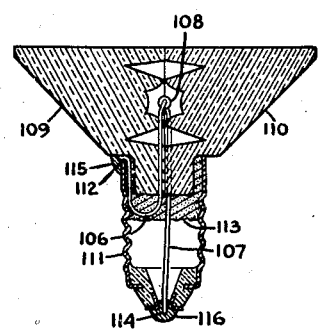

Referring to Fig. 8 which is an enlarged sectional view of a flashlight full-beam electric lamp; having two hollow metal wires 106 and 107 being the lead-in wires which were previously made integrally with a pin-head electric lamp 108 (see previously mentioned Patent 2,222,093, for details of pin-head electric lamp); two halves of a full-beam refracting element 109 and 110 (see Fig. 28 to Fig. 30 for details), being made from heat resisting glass, are coated on their junction surfaces with a thin film of suitable glass fusing material, and after positioning the pin-head lamp 108 in place, the halves are hermetically sealed together by glass fusion; a standard electric lamp miniature screw base 111 having a lead-in wire hole or notched groove at 112, is coated on the inside with a suitable basing cement 113 and cemented to element 109 and 110 as shown, with the hollow metal wires 106 and 107 threaded through the base 111 at 112 and 114; then the pin-head electric lamp is exhausted to a vacuum, or exhausted and filled with an inert gas, at either low or high pressures, up to a safe working pressure, through the hollow metal wires 106 and 107 which are swaged or flattened and cut off to form the preliminary seals and later the final seals at 115 and 116 are made by soldering the ends air tight as they are soldered to the lamp base 111.

In Fig. 8 it is obvious that the pin-head electric lamp 108 can be completely made as an individual lamp, with the final seals near the pin-head lamp bulb, and notched openings cut through the walls of the hollow metal wires 106 and 107 near the final seals for exhausting or gas filling the chambers within the element 109 and 110.

Figure 9:
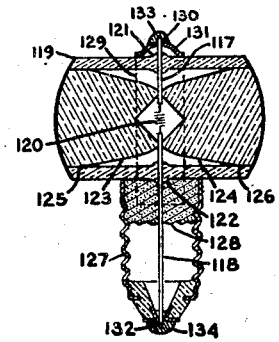

Referring to Fig. 9 which is an enlarged sectional view of a flashlight full-beam electric lamp; having two hollow metal wires 117 and 118 being the lead-in wires with notched openings cut through the walls near the inner ends for exhausting or gas filling operations, are inserted through the holes in the outer glass tube 119 (see Fig. 16 to Fig. 18 for detail); the ends of a coiled electric lamp filament 120 being inserted into the ends of the hollow metal wires 117 and 118, and clamped or spot-welded together, forming the filament mount within the tube 119; the filament mount is positioned, and a mass of glass fusing material is coated around the hollow metal wires 117 and 118, both inside and outside of the tube 119, and then hermetically sealed in place by glass fusion at 121 and 122; two halves of the full-beam refracting element 123 and 124 (see Fig. 16 to Fig. 18 for detail) being made from heat resisting glass, are coated with a thin film of suitable glass fusing material all around at 125 and 126 and (or without coating if desired) hermetically sealed by glass fusion with the outer glass tube 119 at 125 and 126, enclosing the filament 120; a standard electric lamp miniature screw base 127, with its open end cut horizontally cylindrical to form a fit the tube 119, is coated on the inside with a suitable basing cement 123 and later heated for cementing together; a formed thin metal clasp 129, having a hole at 130, and a raised groove at 131 affording clearance for the seal at 121, is placed over the hollow metal wire 117 and tightly wrapped around the tube 119 with the ends inserted into the base 127 and soldered together at the base rim junction, while the other hollow metal wire 118 is threaded through the base end eyelet at 132; then the lamp is exhausted to a vacuum or exhausted and filled with an inert gas, at either low or high pressures, up to a safe working pressure, through the hollow metal wires 117 and 118 which are swaged or flattened and cut off to form the preliminary seals and later the final seals at 133 and 134 are made by soldering the ends air tight as they are soldered to the clasp 129 and the end of the lamp base at 132.

Before proceeding to describe Fig. 10 to Fig. 129, it might be well to first qualify some of the terms used herein. The terms or phrases which I have particularly in mind are those referred to as the "full-beam refracting elements," the "polar axis," and the "equatorial axis" which are described in the following paragraphs.

When light rays are radiated from any light source, each ray propagates in rectilinear movement from such light source until it is stopped by absorption, reflected, or refracted off from such path. The integral paths formed by the light rays from a point light source for any interval in space, would diagrammatically constitute a sphere; but as a point is only a theoretical consideration, it resolves then that the light source must occupy space, which when confined to small dimensions, the light ray paths generate a spheroid in space for such interval.

It is the main object of this invention to devise a means by which all or nearly all of the light rays of such sphere or spheroid shall be gathered into a useful beam, much like lenses or concave mirrors gather only part of the light rays into a beam.

This means by which nearly all light rays of a sphere or spheroid are gathered, I have named and described as the "full-beam refracting elements"; first, by reason of, that it gathers the light in nearly all directions from a concentrated light source, which is nearly or practically all of the light rays therefrom to form a light beam having a minimum angle of divergence. The losses in some cases being as little as ten percent (10%) of the total light, due to lead-in wire obstructions, uncontrollable surface reflections of the glass elements, and light absorption of the glass. Such small losses are obtained when the light source is very small in proportion to the glass full-beam refracting elements surounding it. The smaller the light source, the narrower the divergence angle of the light beam for the same elements surrounding it. When the full-beam refracting elements are very large, their mass of glass also increases which reduces the light ray intensities by absorption; even the most transparent quartz has a light ray intensity loss by absorption of approximately two percent (2%) for each ten centimeters (10 cm.) of light ray path traveled therein, and for most boro-silicate heat resisting glasses, the loss is approximately thirty percent (30%) for ten centimeters (10 cm.) thickness. Second, by reason of, that the light gathering means is accomplished principally by refraction of light rays. In some surfaces, reflection of light rays being accomplished by what is commonly known as total refraction, like in a ninety degree (90°) reflecting prism; when the angle of incidence exceeds the critical angle for dense to rare (glass to air) refraction, light rays emerging from such surfaces refracts back into the glass and obey the laws of reflection with practically no intensity loss. I might state here that much dispute has been among physicists regarding this phenomenon as to whether the light rays actually emerge from the refracting (or reflecting) surface or not and much theory could be written about the subject; however, research from most experiments about it seem to indicate that each light ray emerges to a distance just less than its own wave length, and is refracted back into the glass. The sine of the critical angle being the numerical reciprocal of the refractive index, for a given wave length and known material. In the full-beam refracting elements, the light rays leaving the light source chamber, are refracted at least once, if the ray is not on the optical center. The paths of the refracted light rays are shown diagrammatically in Fig. 130 to Fig. 133, for some of the full-beam refracting elements. In Fig. 10 to Fig. 129 are shown the full-beam refracting elements with some of their adjoining parts, all being made from glass or other suitable material, moulded or otherwise formed around an axis which is explained as follows:

In geometry, it is known that a sphere or spheroid can have three apparent axes which are ninety degrees (90°) apart; for example take the earth, one axis would extend from the north pole to the south pole through the center and is known as the polar axis or true geographical axis of the earth; another theoretical axis would be on the equator extending from the prime meridian to the one-hundred-eighty degree (180°) meridian through the center; another theoretical axis would be on the equator extending from the ninety degree (90°) west longitude meridian to the ninety degree (90°) east longitude meridian through the center; these are the three axes and each one is ninety degrees (90°) from either of the others.

In describing Fig. 10 to Fig. 129, only two axes, or two types of construction, each about an axis, are used, which I refer to only for convenience of differentiation, as the "polar axis" and the "equatorial axis" respectively. These axes are ninety degrees (90°) apart similar to the axes in the preceding paragraph. Some refracting elements are constructed around only one axis, while others are constructed around both axes. These two types of construction will be more apparent after studying the drawings, Fig. 10 to Fig. 129, in comparison with each other.

In Fig. 10 to Fig. 129, the details are generally symmetrical about their center lines, and for convenience, so as not to crowd the numbers, I have shown the numbers designating details of either half indiscriminately, and in only one view.

In Fig. 10 to Fig. 129, each part is shown by three views in third-angle orthographic projection, a plan or top elevation, a side elevation, and the lower one being a center sectional view.

Referring to Fig. 10 to Fig. 12 collectively which shows enlarged views of the refracting elements and enclosing bowl for a flashlight full-beam electric lamp; having the inner full-beam refracting elements 135 and 136 (see Fig. 103 to Fig. 105 for details) being made from heat resisting glass; an outer refracting prismatic ring element 137 having a cone frustum body, whose flanks form a 90° (approximate) prism light reflecting surface at 138, with a flat surface at 139, and a central hole whose surface at 140 is shaped to a convex lens cross-section, around elements 135 and 136; a glass bowl 141, and a glass cover 142, are made to just enclose elements 135, 136, and 137; bowl 141 being a cone frustum bowl whose inside flanks at 143 are slightly curved outward so as to be free from contact with the light reflecting surface at 138 except at the top and bottom rims of element 137; bowl 141 having its inside bottom surface at 144 embossed to a shallow cone frustum to hold elements 135 and 136; bowl 141 having a cylindrical hub 145 with hole 146 for the glass exhaust tube 147; bowl 141 having a flanged brim at 148 which fits the thin edge or flange at 149 of cover 142; cover 142 having a crown ring surface at 150 which is shaped to a convex lens cross-section, with a circular flat at 151, and a circular thin edge or flange at 149; cover 142 being flat at 152, and having its center surface at 153 embossed to a shallow cone frustum to hold elements 135 and 136; lead-in wire grooves 154 and 155 are formed in hole 146 of bowl 141. Element 137 is constructed around the polar axis.

Referring to Fig. 13 to Fig. 15 collectively which shows enlarged views of the refracting elements for a flashlight full-beam electric lamp; having two half full-beam refracting elements 156 and 157 being made from heat resisting glass and fitting together on their center line junction surfaces at 158; each element 156 or 157 having a semi-cylindrical body, and a light source chamber which is formed by a semi-circular ring surface at 159 shaped to a convex lens cross-section, with two semi-cone surfaces at 160 and 161 whose flanks are shaped to a convex lens cross-section; each element 156 or 157 having two semi-cone chambers at 162 and 163 whose flanks form 120° (approximate) prism light reflecting surfaces at 164 and 165 for light rays radiating from the center of the light source chamber; lead-in wire grooves are formed at 166, 167, 168, and 169. Elements 156 and 157 are constructed around the polar axis.

Referring to Fig. 16 to Fig. 18 collectively which shows enlarged views of the refracting elements and connecting tube for a flashlight full-beam electric lamp; having two half full-beam refracting elements 170 and 171 being made from heat resisting glass; each element 170 or 171 having a cylindrical body at 172 with one end formed into a convex lens surface at 173, and the other end cone frustum shaped at 174 with a curve at 175 which approximates a parabolic light reflecting surface at 175 and then curving into a 135° (approximate) prism light reflecting surface 174 for light rays radiating from the center of the light source chamber; the inner end of each element 170 or 171 is recessed into a light source chamber which is formed by a cone surface at 176; lead-in wire grooves are formed at 177 and 178; a glass connecting tube 179, with lead-in wire holes at 180 and 181, is made to just fit over the cylindrical body at 172. Elements 170 and 171 are constructed around the equatorial axis.

Referring to Fig. 19 to Fig. 21 collectively which show enlarged views of the refracting elements for a flashlight full-beam electric lamp; having two half full-beam refracting elements 182 and 183 being made from heat resisting glass and fitting together on their center line junction surfaces at 184; each element 182 or 183 having a semi-cone frustum body whose flanks form a 90° (approximate) prism light reflecting surface at 185 with a small semi-cylindrical flat on the large end at 186 and a base attaching semi-cylindrical hub at 187; each element 182 or 183 having a light source chamber which is formed by a semi-circular ring surface at 188 shaped to a convex lens cross-section, with two semi-cone surfaces at 189 and 190 whose flanks are shaped to a convex lens cross-section; each element 182 or 183 having two semi-cone chambers at 191 and 192 whose flanks form 120° (approximate) prism light reflecting surfaces at 193 and 194 for light rays radiating from the center of the light source chamber; lead-in wire grooves are formed at 195, 196, 197, and 198. Elements 182 and 183 are constructed around the polar axis.

Referring to Fig. 22 to Fig. 24 collectively which show enlarged views of the refracting elements and enclosing tube for a flashlight full-beam electric lamp; having two half full-beam refracting elements 199 and 200 (see Fig. 91 to Fig. 93 for details) being made from heat resisting glass; a glass tube 201 with flared flanges at 202 and 203, is made to just fit around elements 199 and 200; lead-in wire holes at 204 and 205 are formed in the tube 201; two plano-convex glass lenses 206 and 207 having thin edges or flanges at 208 and 209 that are made to fit the flanges at 202 and 203 of tube 201 and enclose elements 199 and 200.

Referring to Fig. 25 to Fig. 27 collectively which show enlarged views of the refracting elements for a flashlight full-beam electric lamp; having two half full-beam refracting elements 210 and 211 being made from heat resisting glass and fitting together on their center line junction surfaces at 212; each element 210 or 211 having a semi-circular body which is crowned around the outer surface at 213 to form the shape of a convex lens cross-section, and a base attaching semi-cylindrical hub at 214; each element 210 or 211 having two semi-conical chambers whose flanks at 215 and 216 are conical shaped with curves at 217 and 218 whose cross-section approximates parabolic light reflecting surfaces at 217 and 218 and then curving into 135° (approximate) prism light reflecting surfaces at 215 and 216 for light rays radiating from the center of the light source chamber, and shaped to a shallow cone at 219 and 220; each element 210 and 211 having a semi-circular light source chamber which is formed by semi-circular double cone surfaces at 221 and 222; lead-in wire grooves are formed at 223, 224, 225, and 226. Elements 210 and 211 are constructed around the polar axis.

Referring to Fig. 28 to Fig. 30 collectively which show enlarged views of the refracting elements for a flashlight full-beam electric lamp; having two half full-beam refracting elements 227 and 228 being made from heat resisting glass and fitting together on their center line junction surfaces at 229; each element 227 or 228 having a body which is flat on one face 230 and semi-cylindrical on the opposite side therefrom at 231, with the end at 232 made semi-cylindrical and mitered to form a 90° (approximate) prism light reflecting surface at 233; each element 227 or 228 having a base attaching semi-cylindrical hub at 234; each element 227 or 228 having its inner end face at 229 recessed into a light source chamber with a small convex lens surface at 235 and a cone frustum at 236 whose flanks are shaped to a convex lens cross-section; each element 227 or 228 having its inner end face at 229 also recessed into a cone frustum whose flanks form a 120° (approximate) prism light reflecting surface at 237 for light rays radiating from the center of the light source chamber, and tapering to a cone frustum at 238; lead-in wire grooves are formed at 239, 240, 241, and 242. The light source chamber and the semi-cylindrical body at 231 is constructed around the equatorial axis, while the semi-cylindrical end at 232 is constructed parallel to the polar axis which passes through the center of the hub 234.

Referring to Fig. 31 to Fig. 33 collectively which show enlarged views of the refracting elements and connecting plates for a flashlight full-beam electric lamp; having the inner full-beam refracting element 243 (see Fig. 43 to Fig. 45 for details), and four quarter full-beam refracting elements 244, 245, 246, and 247, all being made from heat resisting glass and fitting together on their center line junction surfaces at 248 and 249; each element 244, 245, 246, or 247 having a quadrant cylindrical body with upper and lower parallel flat rims at 250 and 251, and tapering inward to quadrant cones whose flanks form 120° (approximate) prism light reflecting surfaces at 252 and 253 for light rays radiating from the center of the light source chamber within element 243; each element 244, 245, 246, or 247 having a quadrant spherical chamber at 254 enclosing element 243; lead-in wire grooves are formed at 255 and 256; two glass circular connecting plates 257 and 258 fitting the elements 244, 245, 246, and 247 on their respective rims at 250 and 251; lead-in wire holes at 259 and 260 are formed in the lower plate 258. Elements 244, 245, 246, and 247 are constructed around the polar axis.

Referring to Fig. 34 to Fig. 36 collectively which show enlarged views of the refracting elements and enclosing cup for a flashlight full-beam electric lamp; having two half full-beam refracting elements 261 and 262 (see Fig. 124 to Fig. 126 for similar detail) being made from heat resisting glass; a cylindrical glass cup 263 with a flared brim at 264, is made to just fit over elements 261 and 262; an outer glass flange 265 having a shallow cylindrical cup at 266, and a hub at 267 with a hole at 268 for the glass exhaust tube 269, is fitted into the end of cup 263 with the flange at 265 fitting the cup brim at 264 and enclosing elements 261 and 262; lead-in wire grooves at 270 and 271 are formed in hole 268 of the outer flange 265.

Referring to Fig. 37 to Fig. 39 collectively which show enlarged views of the refracting elements and connecting tube for a flashlight full-beam electric lamp; having two half full-beam refracting elements 272 and 273 being made from heat resisting glass; each element 272 or 273 having a cylindrical body at 274, tapering into a cone frustum whose flanks form a 120° (approximate) prism light reflecting surface at 275 for light rays radiating from the center of the light source chamber; the inner end of each element 272 or 273 is recessed into a light source chamber with a small convex lens surface at 276 and a cone frustum at 277 whose flanks are shaped to a convex lens cross-section; lead-in wire grooves are formed at 278 and 279; a glass connecting tube 280 with lead-in wire holes at 281 and 282, is made to just fit over the cylindrical body at 274. Elements 272 and 273 are constructed around the equatorial axis.

Referring to Fig. 40 to Fig. 42 collectively which show enlarged views of the inner refracting elements for a flashlight full-beam electric lamp; having two half full-beam refracting elements 283 and 284, each being an hemisphere made from heat resisting glass and fitting together on their center line junction surfaces at 285; each element 283 or 284 having a light source chamber which is formed by a semi-circular ring surface at 286 shaped to a convex lens cross-section, with two semi-cone surfaces at 287 and 288 whose flanks are shaped to a convex lens cross-section; lead-in wire grooves are formed at 289 and 290. Elements 283 and 284 are constructed around the polar axis.

Referring to Fig. 43 to Fig. 45 collectively which show enlarged views of the inner refracting elements for a flashlight full-beam electric lamp; having two half full-beam refracting elements 291 and 292 being made from heat resisting glass and fitting together on their center line junction surfaces at 293; each element 291 or 292 having an outer semi-circular ring surface at 294 shaped to a convex lens cross-section, with two outer semi-cone surfaces at 295 and 296 whose flanks are shaped to a convex lens cross-section; each element 291 or 292 having a light source chamber which is formed by a semi-circular ring surface at 297 shaped to a convex lens cross-section, with two semi-cone surfaces at 298 and 299 whose flanks are shaped to a convex lens cross-section; lead-in wire grooves are formed at 300 and 301. Elements 291 and 292 are constructed around the polar axis.

Referring to Fig. 46 to Fig. 48 collectively which show enlarged views of the inner refracting elements for a flashlight full-beam electric lamp; having two half full-beam refracting elements 302 and 303 being made from heat resisting glass and fitting together on their center line junction surfaces at 304; each element 302 or 303 having an outer semi-circular ring surface at 305 shaped to a convex lens cross-section, with two outer semi-cone surfaces at 306 and 307 whose flanks are shaped to a convex lens cross-section; each element 302 or 303 having an hemispherical light source chamber at 308; lead-in wire grooves are formed at 309 and 310. Elements 302 and 303 are constructed around the polar axis.

Referring to Fig. 49 to Fig. 51 collectively which show enlarged views of the inner refracting elements for a flashlight full-beam electric lamp; having two half full-beam refracting elements 311 and 312 being made from heat resisting glass and fitting together on their center line junction surfaces at 313; each element 311 or 312 having an outer semi-circular ring surface at 314 shaped to a convex lens cross-section, with two outer semi-cone surfaces at 315 and 316 whose flanks are shaped to a convex lens cross-section; each element 311 or 312 having a light source chamber which is formed by a semi-cylindrical surface at 317, with two semi-cone surfaces at 318 and 319; lead-in wire grooves are formed at 320 and 321. Elements 311 and 312 are constructed around the polar axis.

Referring to Fig. 52 to Fig. 54 collectively which show enlarged views of the inner refracting elements for a flashlight full-beam electric lamp; having two half full-beam refracting elements 322 and 323 each being an hemisphere made from heat resisting glass and fitting together on their center line junction surfaces at 324; each element 322 or 323 having a light source chamber which is formed by a semi-cylindrical surface at 325, with two semi-cone surfaces at 326 and 327; lead-in wire grooves are formed at 328 and 329. Elements 322 and 323 are constructed around the polar axis.

Referring to Fig. 55 to Fig. 57 collectively which show enlarged views of the inner refracting elements for a flashlight full-beam electric lamp; having two half full-beam refracting elements 330 and 331 being made from heat resisting glass and fitting together on their center line junction surfaces at 332; each element 330 or 331 having an outer semi-cylindrical surface at 333 with two outer semi-cone surfaces at 334 and 335; each element 330 or 331 having a light source chamber which is formed by a semi-circular ring surface at 336 shaped to a convex lens cross-section, with two semi-cone surfaces at 337 and 338 whose flanks are shaped to a convex lens cross-section; lead-in wire grooves are formed at 339 and 340. Elements 330 and 331 are constructed around the polar axis.

Referring to Fig. 58 to Fig. 60 collectively which show enlarged views of the inner refracting elements for a flashlight full-beam electric lamp; having two half full-beam refracting elements 341 and 342 each being an hemisphere made from heat resisting glass and fitting together on their center line junction surfaces at 343; each element 341 or 342 having a light source chamber which is formed by a cone surface at 344; lead-in wire grooves are formed at 345 and 346. Elements 341 and 342 are constructed around the equatorial axis.

Referring to Fig. 61 to Fig. 63 collectively which show enlarged views of the inner refracting elements for a flashlight full-beam electric lamp; having two half full-beam refracting elements 347 and 348 each being an hemisphere made from heat resisting glass and fitting together on their center line junction surfaces at 349; each element 347 or 348 having a light source chamber which is formed by a cone surface at 350 whose flanks are shaped to convex lens cross-section; lead-in wire grooves are formed at 351 and 352. Elements 347 and 348 are constructed around the equatorial axis.

Referring to Fig. 64 to Fig. 66 collectively which show enlarged views of the inner refracting elements for a flashlight full-beam electric lamp; having two half full-beam refracting elements 353 and 354 each being a cone made from heat resisting glass and fitting together on their center line junction surfaces at 355; each element 353 or 354 having a light source chamber which is formed by a cone surface at 356 whose flanks are shaped to a convex lens cross-section; lead-in wire grooves are formed at 357 and 358. Elements 353 and 354 are constructed around the equatorial axis.

Referring to Fig. 67 to Fig. 69 collectively which show enlarged views of the inner refracting elements for a flashlight full-beam electric lamp; having two half full-beam refracting elements 359 and 360 being made from heat resisting glass and fitting together on their center line junction surfaces at 361; each element 359 or 360 having an outer cone surface at 362 whose flanks are shaped to a convex lens cross-section; each element 359 or 360 having a light source chamber which is formed by a cone surface at 363 whose flanks are shaped to a convex lens cross-section; lead-in wire grooves are formed at 364 and 365. Elements 359 and 360 are constructed around the equatorial axis.

Referring to Fig. 70 to Fig. 72 collectively which show enlarged views of the inner refracting elements for a flashlight full-beam electric lamp; having two half full-beam refracting elements 366 and 367 each being a semi-cylinder made from heat resisting glass and fitting together on their center line junction surfaces at 368; each element 366 or 367 having both ends formed into semi-cone surfaces at 369 and 370 whose flanks are shaped to a convex lens cross-section (surfaces 369 and 370 appear in the illustration to be almost spherical; however if they were made with longer radii, then their cone shape would be more apparent); each element 366 or 367 having a light source chamber which is formed by a semi-circular ring surface at 371 shaped to a convex lens cross-section, with two semi-cone surfaces at 372 and 373; lead-in wire grooves are formed at 374 and 375. Elements 366 and 367 are constructed around the polar axis.

Referring to Fig. 73 to Fig. 75 collectively which show enlarged views of the inner refracting elements for a flashlight full-beam electric lamp; having two half full-beam refracting elements 376 and 377 each being a semi-spheroid made from heat resisting glass and fitting together on their center line junction surfaces at 378; each element 376 or 377 having a light source chamber which is formed by a semi-elliptical ring surface at 379 shaped to a convex lens cross-section, with two semi-conoid surfaces at 380 and 381 whose flanks are shaped to a convex lens cross-section; lead-in wire grooves are formed at 382 and 383. Elements 376 and 377 are constructed around the polar axis.

In Fig. 73 to Fig. 75, it is obvious that the inner refracting elements can be made into many other oval shapes such as ellipsoids, paraboloids, hyperboloids, or any other mathematical curve in revolution, with the light source chambers compensated accordingly.

Referring to Fig. 76 to Fig. 78 collectively which show enlarged views of the inner refracting elements for a flashlight full-beam electric lamp; having two half full-beam refracting elements 384 and 385 being made from heat resisting glass; each element 384 or 385 having a conical body which is formed into a cone frustum whose flanks form a 120° (approximate) prism light reflecting surface at 386 for light rays radiating from the center of the light source chamber; each element 384 or 385 having its large end formed into a convex lens surface at 387, and the small end recessed into a light source chamber which is formed into a small convex lens surface at 388, with the other inner surfaces at 389 formed into a cone frustum whose flanks are shaped to a convex lens cross-section; lead-in wire grooves are formed at 390 and 391. Elements 384 and 385 are constructed around the equatorial axis.

Referring to Fig. 79 to Fig. 81 collectively which show enlarged views of the inner refracting elements for a flashlight full-beam electric lamp; having two half full-beam refracting elements 392 and 393 being made from heat resisting glass; each element 392 or 393 having a conical body which is formed into a cone frustum whose flanks form a 120° (approximate) prism light reflecting surface at 394 for light rays radiating from the center of the light source chamber; each element 392 or 393 having its large end formed into a convex lens surface at 395, and the small end recessed into a light source chamber which is formed by cone frustum surfaces at 396 and 397; lead-in wire grooves are formed at 398 and 399. Elements 392 and 393 are constructed around the equatorial axis.

Referring to Fig. 82 to Fig. 84 collectively which show enlarged views of the inner refracting elements for a flashlight full-beam electric lamp; having two half full-beam refracting elements 400 and 401 being made from heat resisting glass; each element 400 or 401 having a conical body which is formed into a cone frustum at 402 with a curve at 403 which approximates a parabolic light reflecting surface at 403 and then curving into a 135° (approximate) prism light reflecting surface at 402 for light rays radiating from the center of the light source chamber; each element 400 or 401 having its large end formed into a convex lens surface at 404 and the small end recessed into a light source chamber which is formed by a cone surface at 405; lead-in wire grooves are formed at 406 and 407. Elements 400 and 401 are constructed around the equatorial axis.

Referring to Fig. 85 to Fig. 87 collectively which show enlarged views of the inner refracting elements for a flashlight full-beam electric lamp; having two half full-beam refracting elements 408 and 409 being made from heat resisting glass; each element 408 or 409 having a conical body which is formed into a cone frustum whose flanks form a 120° (approximate) prism light reflecting surface at 410 for light rays radiating from the center of the light source chamber; each element 408 or 409 having its large end formed into a convex lens surface at 411, and the small end recessed into a light source chamber which is formed into a small convex lens surface at 412, with the other inner surfaces at 413 formed into a cone frustum; lead-in wire grooves are formed at 414 and 415. Elements 408 and 409 are constructed around the equatorial axis.

Referring to Fig. 88 to Fig. 90 collectively which show enlarged views of the inner refracting elements for a flashlight full-beam electric lamp; having two half full-beam refracting elements 416 and 417 being made from heat resisting glass; each element 416 or 417 having a conical body which is formed into a cone frustum whose flanks form a 120° (approximate) prism light reflecting surface at 418 for light rays radiating from the center of the light source chamber; each element 416 or 417 having its large end formed into a convex lens surface at 419, and the small end recessed into a light source chamber which has a small circular flat surface at 420, with the other inner surfaces at 421 formed into a cone frustum whose flanks are shaped to a convex lens cross-section; lead-in wire grooves are formed at 422 and 423. Elements 416 and 417 are constructed around the equatorial axis.

Referring to Fig. 91 to Fig. 93 collectively which show enlarged views of the inner refracting elements for a flashlight full-beam electric lamp; having two half full-beam refracting elements 424 and 425 being made from heat resisting glass; each element 424 or 425 having a conical body which is formed into a cone frustum at 426 with a curve at 427 which approximates a parabolic light reflecting surface at 427 and then curving into a 135° (approximate) prism light reflecting surface at 426 for light rays radiating from the center of the light source chamber; each element 424 or 425 having its large end formed into a convex lens surface at 428, and the small end recessed into a light source chamber which is formed by a cone surface at 429 whose flanks are shaped to a convex lens cross-section; lead-in wire grooves are formed at 430 and 431. Elements 424 and 425 are constructed around the equatorial axis.

Referring to Fig. 94 to Fig. 96 collectively which show enlarged views of the inner refracting elements for a flashlight full-beam electric lamp; having two half full-beam refracting elements 432 and 433 being made from heat resisting glass; each element 432 or 433 having a conical body which is formed into a cone frustum whose flanks form a 120° (approximate) prism light reflecting surface at 434 for light rays radiating from the center of the light source chamber; each element 432 or 433 having its large end formed into a prismatic lens with two circular refracting surfaces at 435 and 436 respectively, and the small end recessed into a light source chamber which has a small circular flat surface at 437, with the other inner surfaces at 438 formed into a cone frustum whose flanks are shaped to a convex lens cross-section; lead-in wire grooves are formed at 439 and 440. Elements 432 and 433 are constructed around the equatorial axis.

Referring to Fig. 97 to Fig. 99 collectively which show enlarged views of the inner refracting elements for a flashlight full-beam electric lamp; having two half full-beam refracting elements 441 and 442 being made from heat resisting glass; each element 441 or 442 having a cone frustum body whose flanks form an approximate parabolic light reflecting surface at 443 for light rays radiating from the center of the light source chamber, being an hemisphere at 444; each element 441 or 442 having its outer end recessed with a cone frustum surface at 445 and further recessed at 446 to provide for a lens surface at 447; lead-in wire grooves are formed at 448 and 449. Elements 441 and 442 are constructed around the equatorial axis.

Referring to Fig. 100 to Fig. 102 collectively which show enlarged views of the inner refracting elements for a flashlight full-beam electric lamp; having two half full-beam refracting elements 450 and 451 being made from heat resisting glass; each element 450 or 451 having a cone frustum body whose flanks form an approximate parabolic light reflecting surface at 452 for light rays radiating from the center of the light source chamber, being an hemi-spheroid (or any other suitable shape) at 453; each element 450 or 451 having its outer end recessed with a cone frustum surface at 454 and further recessed at 455 to provide for a prismatic lens with two circular refracting surfaces at 456 and 457 respectively; lead-in wire grooves are formed at 458 and 459. Elements 450 and 451 are constructed around the equatorial axis.

Referring to Fig. 103 to Fig. 105 collectively which show enlarged views of the inner refracting elements for a flashlight full-beam electric lamp; having two half full-beam refracting elements 460 and 461 being made from heat resisting glass and fitting together on their center line junction surfaces at 462; each element 460 or 461 having a semi-circular body with ends recessed into semi-cones whose flanks form 120° (approximate) prism light reflecting surfaces at 463 and 464 for light rays radiating from the center of the light source chamber; each element 460 or 461 being crowned around its outer surface at 465 to form the shape of a convex lens cross-section; each element 460 or 461 having a light source chamber which is formed by a semi-cicular ring surface at 466 shaped to a convex lens cross-section, with two semi-cone surfaces at 467 and 468 whose flanks are shaped to a convex lens cross-section; lead-in wire grooves are formed at 469 and 470. Elements 460 and 461 are constructed around the polar axis.

Referring to Fig. 106 to Fig. 108 collectively which show enlarged views of the inner refracting elements for a flashlight full-beam electric lamp; having two half full-beam refracting elements 471 and 472 being made from heat resisting glass and fitting together on their center line junction surfaces at 473; each element 471 or 472 having a semi-circular body with ends recessed into semi-cones whose flanks form 120° (approximate) prism light reflecting surfaces at 474 and 475 for light rays radiating from the center of the light source chamber; each element 471 or 472 being crowned around its outer surface at 476 to form the shape of a convex lens cross-section; each element 471 or 472 having a light source chamber which is formed by a semi-cylinder surface at 477, with two semi-cone surfaces at 478 and 479; lead-in wire grooves are formed at 480 and 481. Elements 471 and 472 are constructed around the polar axis.

Referring to Fig. 109 to Fig. 111 collectively which show enlarged views of the inner refracting elements for a flashlight full-beam electric lamp; having two half full-beam refracting elements 482 and 483 being made from heat resisting glass and fitting together on their center line junction surfaces at 484; each element 482 or 483 having a semi-circular body with ends recessed into semi-cones, whose flanks form semi-cone surfaces at 485 and 486 with curves at 487 and 488 which approximates parabolic light reflecting surfaces at 487 and 488 and then curving into 135° (approximate) prism light reflecting surfaces at 485 and 486 for light rays radiating from the center of the light source chamber; each element 482 or 483 being crowned around its outer surface at 489 to form the shape of a convex lens cross-section; each element 482 or 483 having a light source chamber which is formed by two semi-cone surfaces at 490 and 491; lead-in wire grooves are formed at 492 and 493. Elements 482 and 483 are constructed around the polar axis.

Referring to Fig. 112 to Fig. 114 collectively which show enlarged views of the inner refracting elements for a flashlight full-beam electric lamp; having two half full-beam refracting elements 494 and 495 being made from heat resisting glass and fitting together on their center line junction surfaces at 496; each element 494 or 495 having a semi-circular body with ends recessed into semi-cones whose flanks form 120° (approximate) prism light reflecting surfaces at 497 and 498 for light rays radiating from the center of the light source chamber; each element 494 or 495 being crowned around its outer surface at 499 to form the shape of a convex lens cross-section; each element 494 or 495 having a light source chamber which is formed by a semi-circular ring surface at 500 shaped to a convex lens cross-section, with two semi-cone surfaces at 501 and 502; lead-in wire grooves are formed at 503 and 504. Elements 494 and 495 are constructed around the polar axis.

Referring to Fig. 115 to Fig. 117 collectively which show enlarged views of the inner refracting elements for a flashlight full-beam electric lamp; having two half full-beam refracting elements 505 and 506 being made from heat resisting glass and fitting together on their center line junction surfaces at 507; each element 505 or 506 having a semi-circular body with ends recessed into semi-cones whose flanks form 120° (approximate) prism light reflecting surfaces at 508 and 509 for light rays radiating from the center of the light source chamber; each element 505 or 506 being crowned around its outer surface at 510 to form the shape of a convex lens cross-section; each element 505 or 506 having a light source chamber which is formed by a semi-cylinder surface at 511, with two semi-cone surfaces at 512 and 513 whose flanks are shaped to a convex lens cross-section; lead-in wire grooves are formed at 514 and 515. Elements 505 and 506 are constructed around the polar axis.

Referring to Fig. 118 to Fig. 120 collectively which show enlarged views of the inner refracting elements for a flashlight full-beam electric lamp; having two half full-beam refracting elements 516 and 517 being made from heat resisting glass and fitting together on their center line junction surfaces at 518; each element 516 or 517 having a semi-circular body with ends recessed into semi-cones, whose flanks form semi-cone surfaces at 519 and 520 with curves at 521 and 522, which approximates parabolic light reflecting surfaces at 521 and 522 and then curving into 135° (approximate) prism light reflecting surfaces at 519 and 520 for light rays radiating from the center of the light source chamber; each element 516 or 517 being crowned around its outer surface at 523 to form the shape of a convex lens cross-section; each element 516 or 517 having a light source chamber which is formed by two semi-cone surfaces at 524 and 525 whose flanks are shaped to a convex lens cross-section; lead-in wire grooves are formed at 526 and 527. Elements 516 and 517 are constructed around the polar axis.

Referring to Fig. 121 to Fig. 123 collectively which show enlarged views of the inner refracting elements for a flashlight full-beam electric lamp; having two half full-beam refracting elements 528 and 529 being made from heat resisting glass and fitting together on their center line junction surfaces at 530; each element 528 or 529 having a semi-circular body with ends recessed into semi-cones whose flanks form 120° (approximate) prism light refracting surfaces at 531 and 532 for light rays radiating from the center of the light source chamber; each element 528 or 529 having its outside furrowed into semi-circular grooves, which has the cross-sectional shape of a prismatic lens, with light refracting surfaces at 533, 534, and 535; each element 528 or 529 having a light source chamber which is formed by a semi-cylinder surface at 536, with two semi-cone surfaces at 537 and 538 whose flanks are shaped to a convex lens cross-section; lead-in wire grooves are formed at 539 and 540. Elements 528 and 529 are constructed around the polar axis.

Referring to Fig. 124 to Fig. 126 collectively which show enlarged views of the inner refracting elements for a flashlight full-beam electric lamp; having two half full-beam refracting elements 541 and 542 being made from heat resisting glass and fitting together on their center line junction surfaces at 543; each element 541 or 542 having a semi-circular body with ends recessed into semi-cones whose flanks form approximate parabolic light reflecting surfaces at 544 and 545 for light rays radiating from the center of the light source chamber, being an hemisphere at 546; each element 541 or 542 having its outside formed into semi-cone frustum surfaces at 547 and 548, and furrowed at 549 and 550 to provide for the semi-circular crowned surface at 551 formed to a convex lens cross-section; lead-in wire grooves are formed at 552 and 553. Elements 541 and 542 are constructed around the polar axis.

Referring to Fig. 127 to Fig. 129 collectively which show enlarged views of the inner refracting elements for a flashlight full-beam electric lamp; having two half full-beam refracting elements 554 and 555 being made from heat resisting glass and fitting together on their center line junction surfaces at 556; each element 554 or 555 having a semi-circular body with ends recessed into semi-cones whose flanks form approximate parabolic light reflecting surfaces at 557 and 558 for light rays radiating from the center of the light source chamber, being an hemi-spheroid (or any other suitable shape) at 559; each element 554 or 555 having its outside formed into semi-cone frustum surfaces at 560 and 561, and furrowed at 562 and 563 to provide for semi-circular grooves which have the cross-sectional shape of a prismatic lens with light refracting surfaces at 564, 565, and 566; lead-in wire grooves are formed at 567 and 568. Elements 554 and 555 are constructed around the polar axis.

Figure 131:
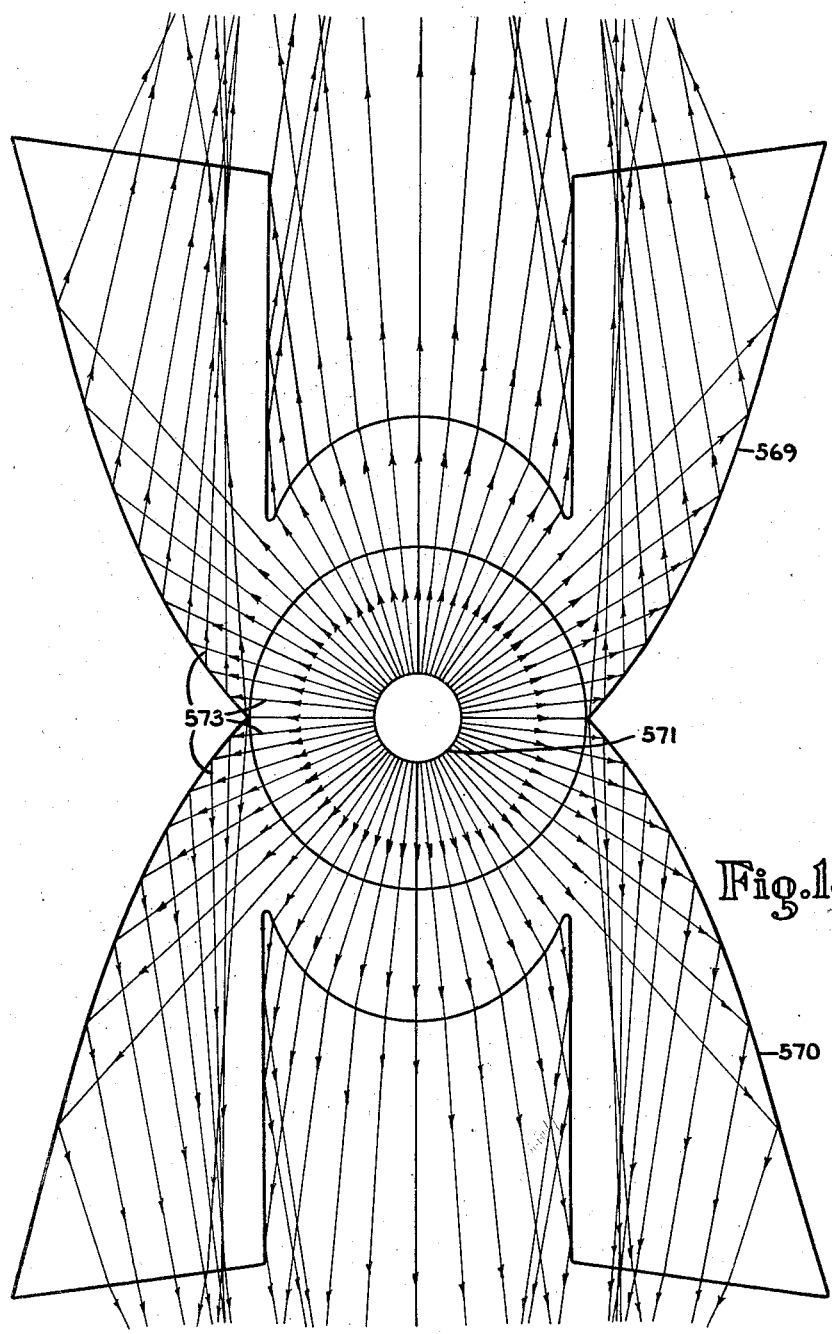
Figure 132:
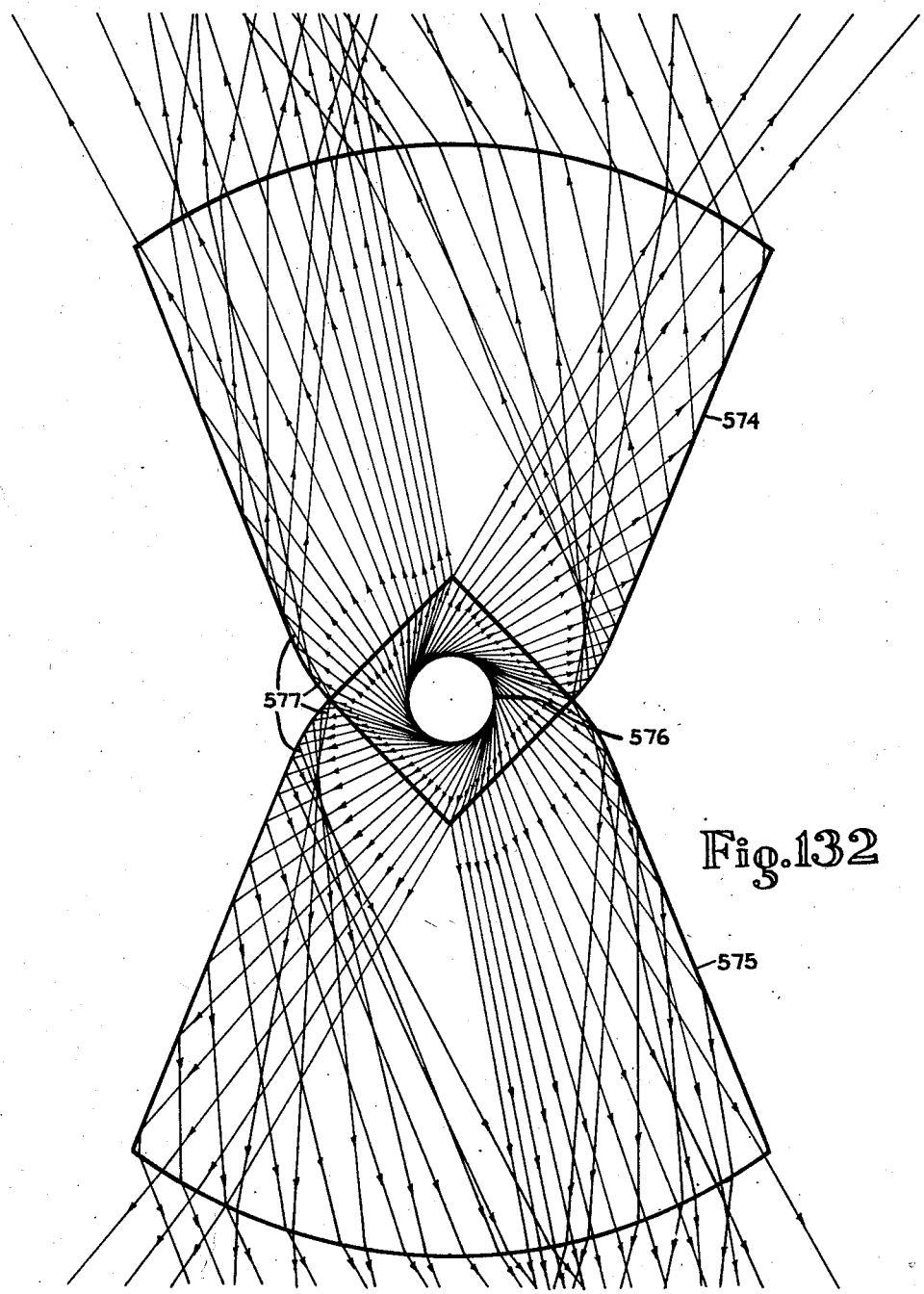
Figure 133:
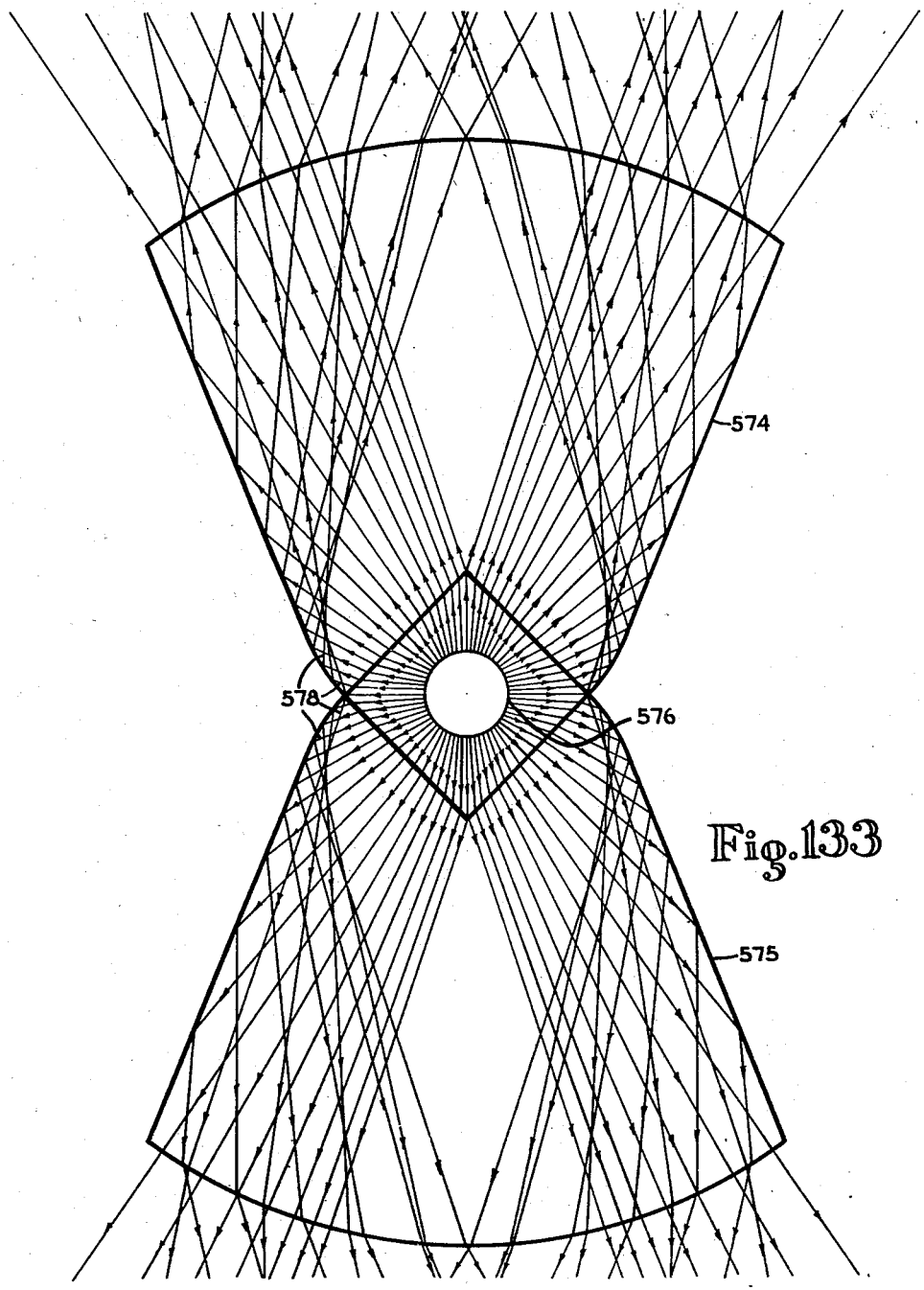

Before proceeding to describe Fig. 130 to Fig. 133, it might be well to state that these illustrations represent only two sets of diagrams, with Fig. 130 and Fig. 131 as one set; Fig. 132 and Fig. 133 as the other set. Each set of diagrams are for the same light source and full-beam refracting elements, which have the same identifying numbers in both diagrams. The difference between diagrams, of each set, being the light-ray lines, which are shown separately in two diagrams, rather than superimposed upon one another in one diagram, thereby avoiding graphic confusion.

In Fig. 130 to Fig. 133, when drawing the light-ray lines in each diagram, the refractive index of one and six-tenths (1.6) was used. This refractive index approximates a sodium D-ray (5893 Angstroms) in medium silicate flint glass. This refractive index would make a critical angle of thirty-eight degrees and forty-two minutes (38°42′) for glass to air refraction, and any light-ray whose angle of incidence exceeds the critical angle, would be refracted back into the glass like reflection on a back surfaced mirror (a common looking glass); however inasmuch as all reflecting surfaces can be mirror coated, the critical angle limits can be disregarded in these diagrams.

While Fig. 130 to Fig. 133, together with diagrams referred to in the preceding paragraph, do not show all of the full-beam refracting elements described herein, yet they present a fair average of them, and by studying these diagrams with the full-beam refracting elements that they represent, comparable diagrams for the other refracting elements can be easily approximated. By keeping in mind that each arrowed line in the diagrams represents the approximate path of a light-ray, and that other light-rays approximately parallel to these lines are also propagated with them, then these diagrams become more or less self explanatory.

Referring to Fig. 130 and Fig. 131, which are enlarged diagrammatic views showing the light propagation within a full-beam refracting element for a flashlight full-beam electric lamp; having the full-beam refracting elements 569 and 570 (similar to element 46 in Fig. 4) enclosing the light source 571. In Fig. 130 the light-rays are shown by arrowed lines 572 (several dozen shown) radiating from tangent surface points of the light source 571. In Fig. 131 the light-rays are shown by arrowed lines 573 (several dozen shown) radiating from surface points at the center of the light source 571. Lines 572 illustrates the propagation of light-rays radiating from points on one extreme edge of the light source 571 in clockwise fashion, and when viewed within a mirror, they appear from the other extreme edge in counter-clockwise fashion; while lines 573 illustrate light-rays from the center or half way between these two extremes; then it is obvious that light-rays from any other point on the light source 571, would propagate on lines somewhere between lines 572 and 573. Light radiating from the light source 571 emerges from elements 569 and 570 in a circular beam resembling a double concave disk, which can be focused together into a single conical beam with a parabolic reflector as shown in Fig. 1, thereby gathering the light from a light source in nearly all directions therefrom and focusing it into a single concentrated light beam.

Referring to Fig. 132 and Fig. 133, which are enlarged diagrammatic views showing the light propagation within a full-beam refracting element for a flashlight full-beam electric lamp; having the full-beam refracting elements 574 and 575 (similar to elements 81 and 82 in Fig. 6) enclosing the light source 576. In Fig. 132 the light-rays are shown by arrowed lines 577 (several dozen shown) radiating from tangent surface points of the light source 576. In Fig. 133 the light-rays are shown by arrowed lines 578 (several dozen shown) radiating from surface points at the center of the light source 576. Lines 577 illustrate the propagation of light-rays radiating from points on one extreme edge of the light source 576 in clockwise fashion, and when viewed within a mirror, they appear from the other extreme edge in counter-clockwise fashion; while lines 578 illustrate light-rays from the center or half way between these two extremes; then it is obvious that light-rays from any other point on the light source 576, would propagate on lines somewhere between lines 577 and 578. Light radiating from the light source 576 emerges from elements 574 and 575 in two opposing conical beams, which can be brought together into a single conical beam with a parabolic reflector as shown in Fig. 1, thereby gathering the light from a light source in nearly all directions therefrom and focusing it into a single concentrated light beam.

It would be a tremendous task to show by drawings, all of the possible combinations to make full-beam refracting elements which are basicly illustrated in this invention together with my copending applications Serial Numbers 480,-420; 480,421; 480,422; 480,423 and 480,424; however the elements would be all primarily based around the construction of the light source chamber in combination with other refracting (or reflecting) surfaces used integrally therewith. The designs of the light source chamber surfaces would start with two opposing cone surfaces like shown in Fig. 84 and would end with a sphere or spheroid, as shown in Fig. 99 or Fig. 102. Starting in with Fig. 84, there are four (4) line surfaces or cusps shown at 405 in the cross-section; next in Fig. 81, there are six (6) line surfaces or cusps shown at 396 and 397; next eight (8) could be shown; then ten (10), twelve (12), et cetera until a sphere or spheroid is reached as in Fig. 99 or Fig. 102. The line surfaces or cusps could be straight as shown in Fig. 84 and Fig. 81, or they could be curved to any suitable refracting shape as shown in Fig. 93 and Fig. 78. The corresponding outer surfaces for four (4) cusps would be like shown in Fig. 82; next for six (6) cusps would be like shown in Fig. 79; then for eight (8) cusps, and all numbers thereafter until a sphere or spheroid is reached, would be generally similar to Fig. 97. With the inner refracting elements, the outer surfaces would be made complementary to the light source chamber surfaces, with four (4) cusps like shown in Fig. 64; with six (6) cusps as shown in Fig. 56; then eight (8) cusps, ten (10), twelve (12), etc. until a sphere or spheroid, Fig. 40 or Fig. 73, is reached, with the cusps being made straight or curved to any suitable light refracting shape. With the inner refracting elements, when the light source chamber surfaces resemble a hypocycloid with 4, 6, 8, 10, 12, etc. cusps, then the outer surfaces are made complementary to resemble a hypercycloid with 4, 6, 8, 10, 12, etc., cusps (see Fig. 45 for six (6) cusps hypocycloid and hypercycloid cross-section). In the drawings, I have shown full-beam refracting elements whose light source chambers have four (4) and six (6) cusps, and a sphere and spheroid, and amitting those that have 8, 10, 12, etc. cusps. Also, I have not shown even all symmetrical combinations possible with four (4) and six (6) cusps designs as can be seen by Fig. 72, where some cusps differ within a single full-beam refracting element, like shown in Fig. 72 at 371 and 372, where some cusps are straight and the other cusps are curved. Then there are many more mixed combinations which could be shown, where half of one element is used with half of another matchable element. Also some of the full-beam refracting elements previously referred to in this paragraph are constructed around the equatorial axis, and the others around the polar axis, and it is evident after studying the drawings that the features illustrated herein will apply equally well with either the polar or equatorial axis construction.

The full-beam refracting elements shown or described herein, and in my copending applications Serial Numbers 480,420; 480,421; 480,422; 480,423 and 480,424, can be made into as many or as few pieces as will readily adapt themselves to the manufacture of the full-beam electric lamps. If it was possible to manufacture a full-beam electric lamp with a refracting element that was made in a monocrystalline mass and still assemble the lead-in wires and light source therein, then such element could be truly reckoned as a single element; however when made with two or more pieces which are cemented or fused together as described herein, it functions as though it was made as a single full-beam refracting element. Throughout this description, I refer to both element (singular) and elements (plural) for convenience of expression when several pieces respectively are used in the construction of a full-beam refracting element.

When the refracting elements are made of moulded glass, their refracting surfaces can be brought up to a high polish or luster, by dipping or immersing in a mixture of sulphuric and hydrofluoric acids, similar to processes used in the manufacture of commercial cut-glass ware.

For hermetically sealing the glass parts together by glass fusion, many types of glass fusing material can be used; one being a thin gasket or plate made from low fusing glass; others being thin film coatings of the following materials: certain types of commercial vitreous enamel; powdered low fusing glass in a paraffine oil vehicle; potter's silica in a sodium silicate solution. These glass fusing materials will fuse to the glass parts below the regular fusing temperature of the glass from which the parts are made. After the film coatings are applied to the surfaces, they are dried; then the parts are held together and slowly heated until fusing is completed.

For sealing the glass parts together when air tight joints are not required, many types of cements can be used; one of the best types being commercial dental cements, which are usually made of powdered oxides or powdered silicates or mixtures of both, quickly worked together with a solution of concentrated phosphoric acid and used immediately in paste form. Dental cement is strong and is not attacked by water or atmospheric erosion; however if the parts should later require separating (even years later), in just a few minutes it can be done by immersing the parts in a tincture of ferric-chloride solution, which will quickly disintegrate the cement without harming the glass parts.

In some low wattage flashlight full-beam electric lamps, which have a pin-head electric lamp for the light source, the refracting elements can be made from any suitable transparent moulded plastic. Also in any low wattage lamp similar to Fig. 4 or Fig. 5 when having a pin-head electric lamp light source, the outer cup or bowl parts can be made from a suitable transparent moulded plastic without the glass exhaust tubes.

The light reflecting surfaces or those surfaces which by total refraction become light reflecting surfaces, of any full-beam refracting element shown or described herein, can be coated with silver or any other suitable metal to insure a mirrored surface, which at the same time protects those surfaces from becoming fogged, darkened, or ineffective as a refracting surface to reflect light, from the effects of filament sublimation deposits, or other causes like handling during assembling operations.

In Fig. 4 and Fig. 5 the lamps are made with contracted glass exhaust tubes, and it is evident that the other lamps shown herein could also be made with glass exhaust tubes, having the same or slightly modified type of construction.

The flashlight full-beam electric lamps shown or described herein can be adapted to other lighting uses and arrangements, like automobile lights, spot or flood lights, headlights, signal lights, or any other use or arrangement where the light is concentrated into a beam.

In the description of the lamps and full-beam refracting elements shown herein, it is obvious that the sequence of building operations described can be changed without materially altering the finished lamps or elements; also the parts of one lamp or element can be substituted for similar parts in the other lamps or elements, described herein, or in my copending applications Serial Numbers 480,420; 480,421; 480,422; 480,423 and 480,424, thus making other combinations too numerous to show by drawings, therefore a further object of this invention, is that each part or each feature of that part which can be used with another part or feature shown or described herein, shall be an improvement of this invention.

In all lamps shown or described herein, the lead-in wires can be hollow metal wires, which will serve as exhaust and gas filling tubes to seal such lamps without any glass exhaust tubes being required; also it is not necessary to make all lead-in wires from hollow metal wires as the lamp can be exhausted or gas filled through only one hollow metal wire while the other lead-in wire is made from solid metal wire.

One of the chief features of the full-beam electric lamp, is that it introduces a new type of electric lamp construction whereby it is possible to build electric lamps with integral refracting elements which gather nearly all of the light-rays from the lamp's light source, or gathers the light-rays in nearly all directions from a light source into a concentrated light beam having a comparatively narrow angle of divergence. While it would be possible to build the full-beam refracting elements very large, yet this type of construction was designed for lamps having relatively small light source chambers and low wattage in which the large masses of glass do not become hazardous from the effects of unequal heating by the light source. In spite of the small masses of glass which are required for most of the flashlight full-beam refracting elements, it is a further object of this invention not to limit the actual size of the full-beam electric lamp, because as stronger and more heat resisting glasses are perfected, the masses of glass making up the volume of the full-beam refracting elements can be increased proportionately to make still larger full-beam electric lamps which have higher wattages.

In view of the drawings and preceding description, it is obvious that the improvements of this invention can be used to make many more full-beam electric lamps other than those shown and described herein; therefore in anticipation of the manufacture of such lamps, it is a further object of this invention to extend the claims to include any electric lamp or light gathering means which uses one or more of the improvements described or claimed herein.

I claim:

1. An electric lamp having a light source, leads to said light source, a receptacle closing the same, said receptacle composed of relatively thick transparent lens sections, the interior space enclosed by said receptacle being of relatively small volume as compared to the lens volume, all of said lens sections arranged to form full-beam refracting elements and give a maximum light value in predetermined directions.

2. A full-beam refracting element for an electric lamp, consisting of, two matched semi-circular bodies composed of light transmitting material, said bodies having junction surfaces upon which they are united to form a unified element, said element having optical sections arranged to form a chamber for the light source of said electric lamp, said optical sections having lens and prism surfaces which gather light in nearly all directions from said light source into predetermined directions.

3. An electric lamp full-beam refracting element, consisting of, several matched bodies composed of light transmitting material, said bodies having junction surfaces upon which they are united to form a unified element, said element having a light source chamber for said electric lamp, said chamber having its walls formed into a series of curved surfaces which have the cross-sectional shape of a convex lens, said element having prism light reflecting surfaces in coordinated arrangement with said curved surfaces to reflect light therefrom, said element gathering the light from a light source within said chamber in nearly all directions therefrom into predetermined directions.

4. An electric lamp as set out in claim 1, wherein the light source is an electric lamp filament.

5. An electric lamp as set out in claim 1, wherein the light source is a pin-head electric lamp.

6. An electric lamp as set out in claim 1, wherein the leads to said light source are regular 3-piece electric lamp lead-in wires.

7. An electric lamp as set out in claim 1, wherein the leads to said light source are solid wires.

8. An electric lamp as set out in claim 1, wherein the leads to said light source are hollow metal wires.

HAROLD SWANSON.